(12) United States Patent
Hwang et al.

(10) Patent No.: US 7,712,387 B2
(45) Date of Patent: May 11, 2010

(54) PELVIS ASSEMBLY FOR DUMMY MODEL

(75) Inventors: Su Hwan Hwang, Hwaseong-si (KR); Seok Hwan Kim, Gunpo-si (KR); Hyung Yun Choi, Seoul (KR); In Bae Chang, Chuncheon-si (KR); Kyung Min Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 305 days.

(21) Appl. No.: 11/966,598

(22) Filed: Dec. 28, 2007

(65) Prior Publication Data
US 2009/0056481 A1  Mar. 5, 2009

(30) Foreign Application Priority Data
Sep. 5, 2007  (KR) ...................... 10-2007-0089904

(51) Int. Cl.
*G09B 23/32* (2006.01)
*G01M 17/007* (2006.01)

(52) U.S. Cl. .................................... 73/866.4

(58) Field of Classification Search ................. 73/866.4
See application file for complete search history.

(56) References Cited

U.S. PATENT DOCUMENTS 7,597,017 B2 * 10/2009 Bedard et al. .............. 73/866.4
2009/0025492 A1 * 1/2009 Hwang et al. .............. 73/866.4

* cited by examiner

*Primary Examiner*—Thomas P Noland
(74) *Attorney, Agent, or Firm*—Morgan, Lewis & Bockius LLP

(57) ABSTRACT

A pelvis assembly for a dummy includes a pelvic plate attached to a lumbar region of the dummy, and one of more pelvic units, attached to the pelvic plate to transmit motion from a femur bar of the dummy to the plate. Each pelvic unit includes a hip joint, attached to the femur bar; a rotary axle, a first end of which is attached to the hip joint, and which is disposed laterally, to rotate together with the hip joint when the femur bar pivots vertically; and one or more pelvic angle adjusters, installed near a second end of the rotary axle, to transmit rotation of the rotary axle to the pelvic plate, thereby changing a vertical angle of the pelvic plate.

6 Claims, 5 Drawing Sheets

PELVIS ASSEMBLY FOR DUMMY MODEL

CROSS-REFERENCE TO RELATED APPLICATIONS

This application claims priority to Korean Application No. 10-2007-0089904, filed on Sep. 5, 2007, the disclosure of which is incorporated herein by reference.

BACKGROUND OF THE INVENTION

1. Field of the Invention

The present invention relates to a pelvis assembly for a dummy used to evaluate the comfort of a vehicle seat.

2. Description of the Background Art

A dummy used to evaluate the comfort of a vehicle seat prototype should be able to accurately mimic various positions of human occupants. The angle of a human occupant's pelvis, for example, depends on the positioning of his/her thighs.

SUMMARY OF THE INVENTION

A pelvis assembly for a dummy includes a pelvic plate attached to a lumbar region of the dummy, and one of more pelvic units, attached to the pelvic plate to transmit motion from a femur bar of the dummy to the plate. Each pelvic unit includes a hip joint attached to the femur bar; a rotary axle, a first end of which is attached to the hip joint and which is disposed laterally, to rotate together with the hip joint when the femur bar pivots vertically; and one or more pelvic angle adjusters, installed near a second end of the rotary axle, to transmit rotation of the rotary axle to the pelvic plate, thereby changing a vertical angle of the pelvic plate.

The pelvic angle adjusters may include a seesaw lever, a core part of which is coupled near the second end of the rotary axle, and having front and rear lever parts that undergo a seesaw motion when the rotary axle rotates; and two spring members, a lower end of one being attached to the front lever part, a lower end of the other being attached to the rear lever part, and an upper end of each of which is attached to the pelvic plate.

A pair of adjuster bolts may be installed on the pelvic plate so as to be able to adjust an amount of compression of the spring members.

An angle sensor, which detects a rotational angle of the rotary axle, may be provided at the second end of the rotary axle.

The hip joint may include a body, to which the first end of the rotary axle is fixed; and a vertical rotary spindle, which is rotatably installed on the body and attached to the femur bar.

Two pelvic units may be provided at left and right sides of the pelvic plate. The vertical angle of the pelvic plate can be individually changed on a basis of movement of one of the femur bars.

BRIEF DESCRIPTION OF THE DIM WINGS

The above and other features of the present invention will now be described in detail with reference to certain exemplary embodiments thereof illustrated the accompanying drawings which are given hereinbelow by way of illustration, and thus are not limitative of the present invention, and wherein.

Figure 1:
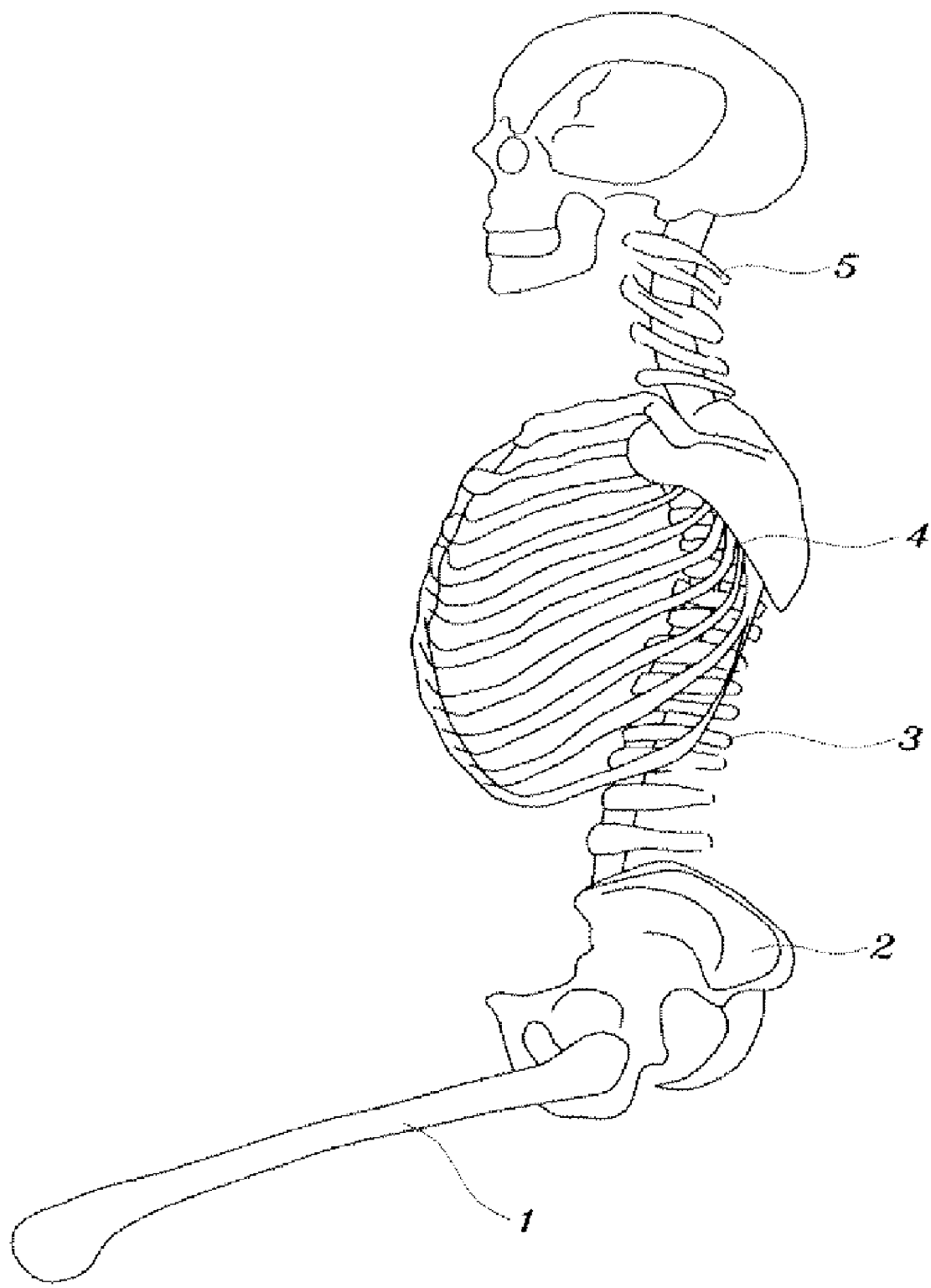
FIGS. 1 and 2 are views illustrating the relationship between the position of a femur and the positions of the pelvis and the vertebral column in a human.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF PREFERRED EMBODIMENTS

Reference will now be made in detail to a preferred embodiment of the present invention, an example of which is illustrated in the accompanying drawings and described below. While the invention will be described in conjunction with an exemplary embodiment, it should be understood that the description is not intended to limit the invention to the exemplary embodiment. On the contrary, the invention is intended to cover not only the exemplary embodiment, but also various alternatives, modifications, equivalents and other embodiments, which may be included within the spirit and scope of the invention as defined by the appended claims.

As mentioned above, a dummy used to evaluate the comfort of a vehicle seat prototype should be able to accurately mimic various positions of human occupants. In particular, the skeletal or articular structure of a human being needs to be mimicked in the dummy. In this respect, it is necessary to pay attention to the fact that the position of the vertebral column is influenced by the angle of the pelvis, and furthermore, that the angle of the pelvis is influenced by the position of the thighs.

Figure 2:
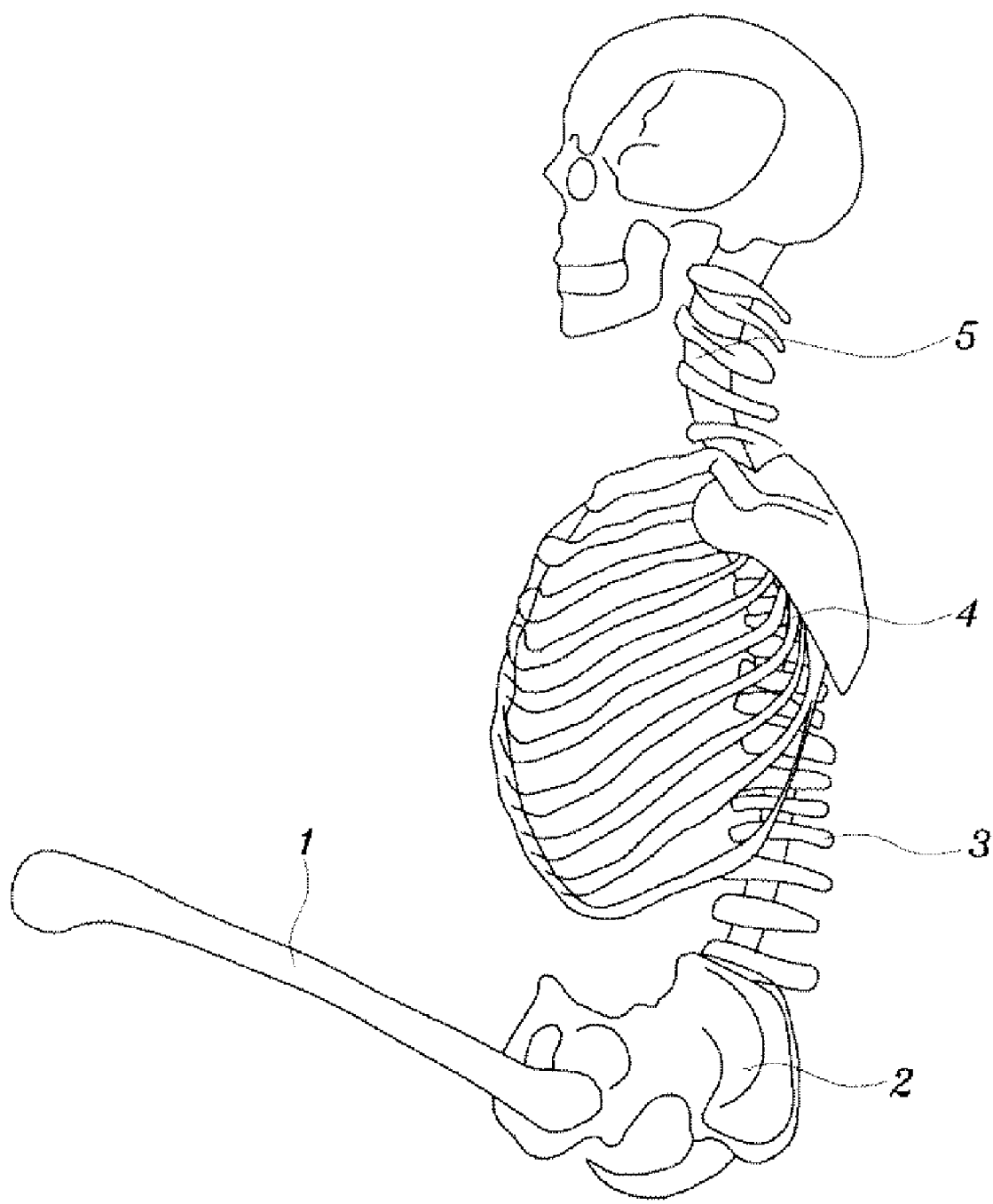

FIGS. 1 and 2 show the position of the vertebral column of a seated human being. As shown in FIG. 1, when each femur 1 is angled below a horizontal plane extending outwards from the hip joint, the pelvis 2 is rotated forward. Thus, a vertebral column, particularly the lumbar 3, is bent forward towards the stomach. In contrast as shown in FIG. 2, when the femur 1 is tilted above the horizontal plane, the pelvis 2 is rotated backward. Thus, the lumbar 3 is bent backward. In addition, the angular change of the femur 1 causes the shape of the thorax 4 to change slightly. The position of the vertebral column also has an influence on the position of the cervical vertebrae 5.

The angle of the seat exerts a direct influence on the angle of the femur. For this reason, a dummy used to evaluate the comfort of a vehicle seat prototype should have a pelvis assembly that mimics changes in the position of the vertebral column depending on the change in the angle of the femur.

Figure 3:
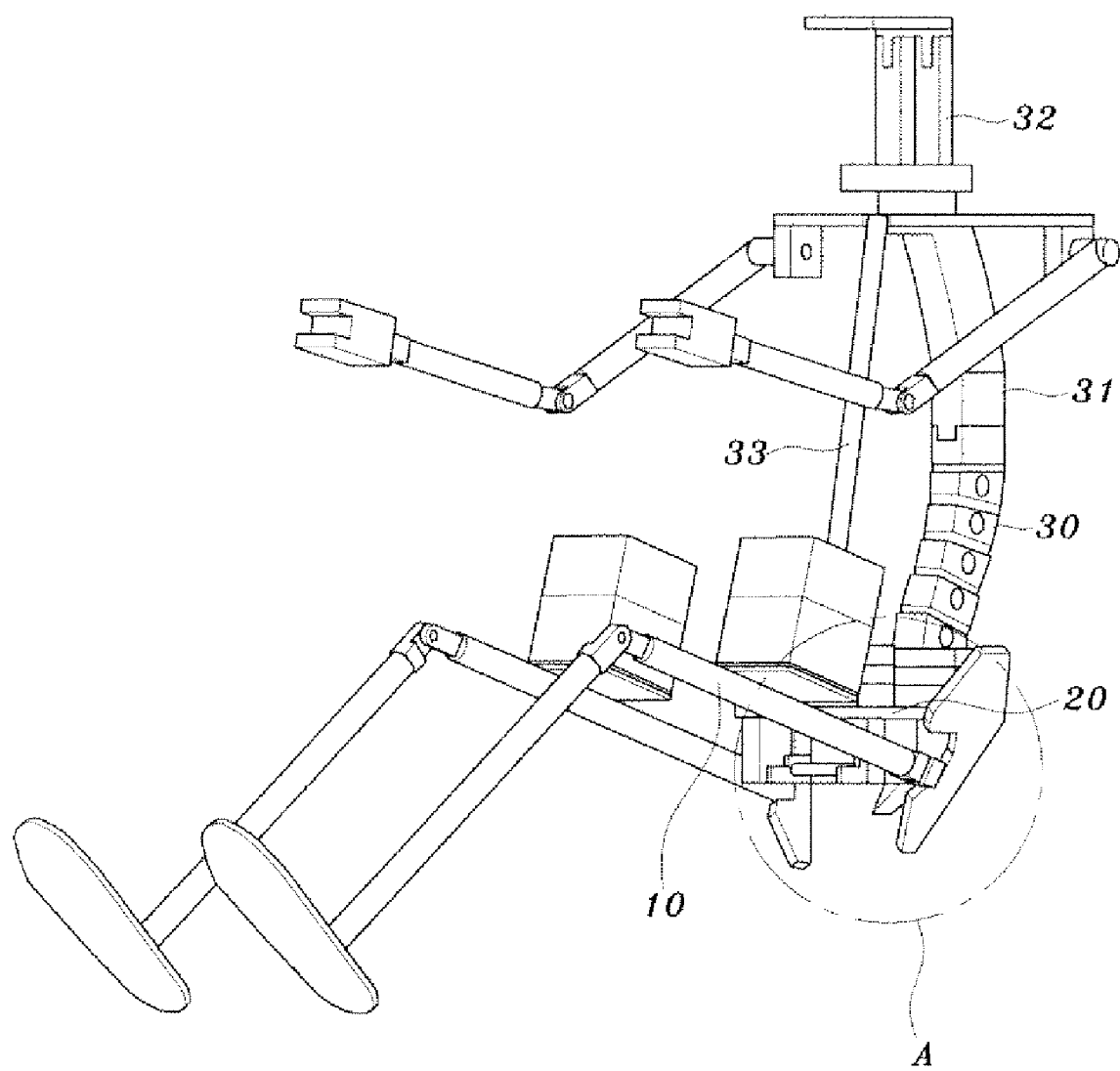
FIG. 3 is a perspective view of a dummy according to an embodiment of the present invention.

Referring to FIG. 3, a dummy is generally humanoid in shape, include limbs, a vertebral column 31, a neck/head 32, and a pelvis assembly A, corresponding to a human pelvic region.

A posture restrictive rod 33 is connected between a shoulder girdle and a pelvic plate 20 of the dummy for restricting the change in the position of the dummy, particularly, the vertebral column 31, within a predetermined range. When the angle of the pelvic plate 20 changes, the angle of the vertebral column 31, particularly the lumbar region 30, changes within a predetermined range. The angular change of the pelvic plate 20 is associated with the change in the angle of each femur bar 10.

Figure 4:
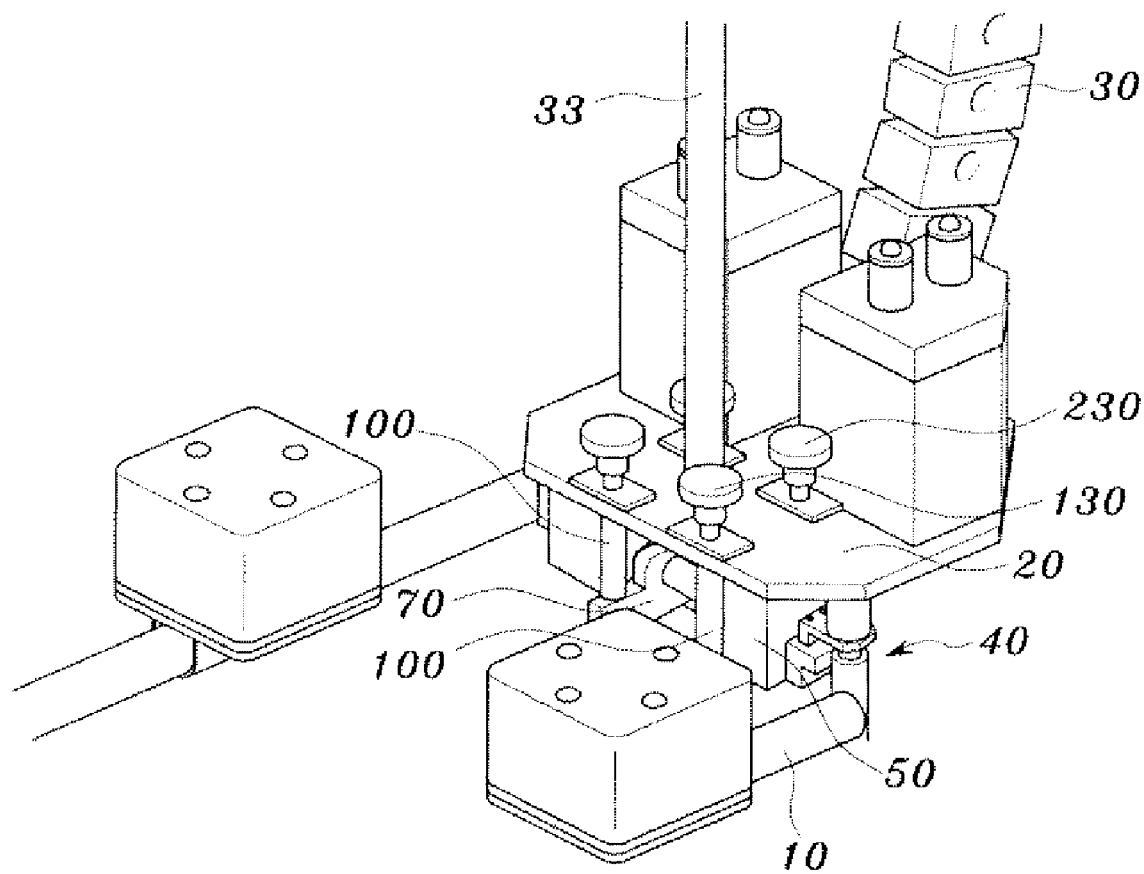
FIG. 4 is a perspective view illustrating the pelvis assembly indicated by part A of FIG. 3.

As illustrated in FIG. 4, the lower end of the rod 33 is connected to the pelvic plate 20. Although not illustrated in FIG. 4, the lower aid of the lumbar region 30 is also connected to the pelvic plate 20.

Figure 5:
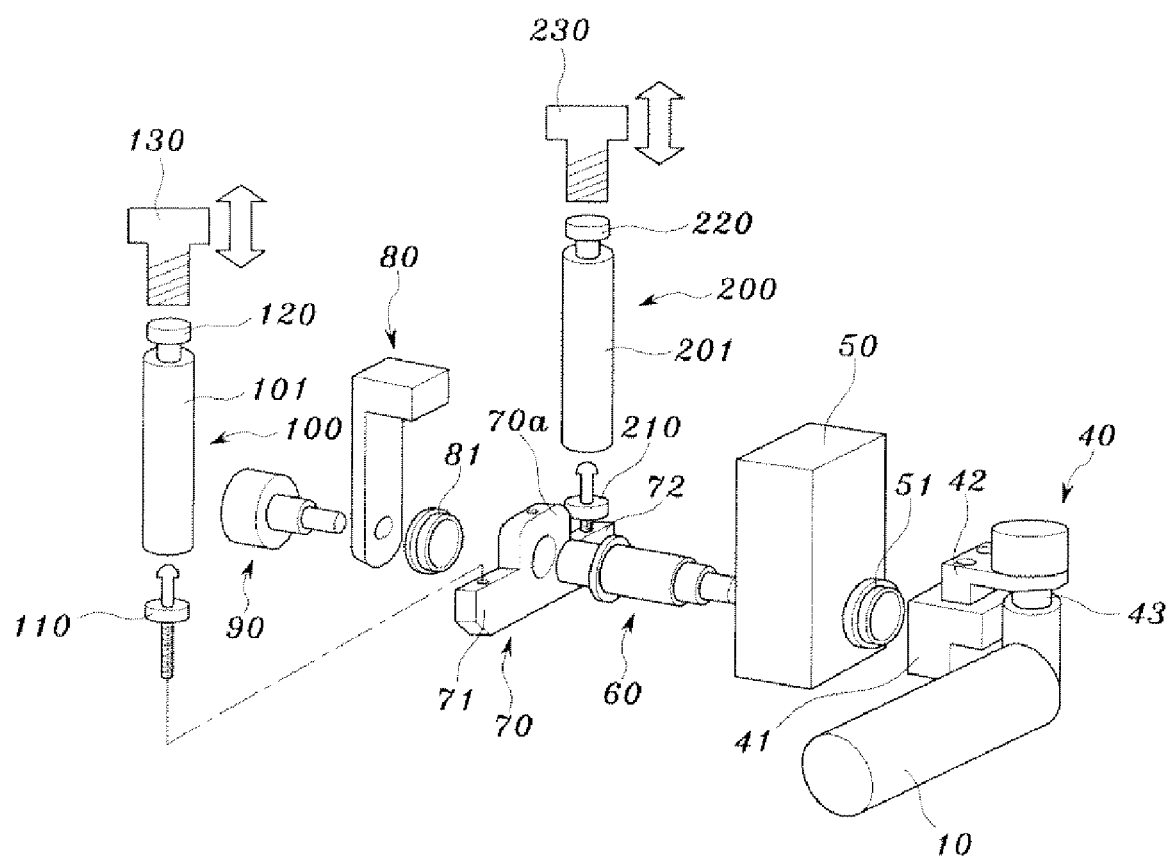
FIG. 5 is an exploded perspective view of the pelvis assembly of FIG. 4.

Referring to FIGS. 4 and 5, the pelvis assembly A generally comprises the pelvic plate 20 and members for transmitting changes in the position of each femur bar 10 to the pelvic plate 20.

The pelvic plate 20 is a flat, horizontal plate, and serves as a medium by which the position of the lumbar region 30 is changed depending on the movement of the femur bar 10.

The members for transmitting the positional change of each femur bar 10 to the pelvic plate 20, for example a hip joint 40, a rotary axle 60 and pelvic angle adjusters 70, 100 and 200, are installed under the pelvic plate 20. In some embodiments, two sets of the members are installed symmetrically on the left and right sides of the pelvic plate 20. For simplicity, only one of the sets of members will be described below.

The hip joint 40 makes it possible to move the femur bar 10 in vertical and horizontal directions. To this end, the upper end of the femur bar 10 is coupled to the hip joint 40, and the rotary axle 60 (FIG. 5) is coupled to the hip joint 40 perpendicular to the femur bar 10. More specifically, one end of the rotary axle 60 is fixed to the body 41 of the hip joint 40. Thus, when the femur bar 10 is pivoted in a vertical direction, the hip joint 40 rotates together with the rotary axle 60. Further, one end of the femur bar 10 is fixed to a vertical rotary spindle 43, which is rotatably installed on the body 41 of the hip joint 40 via a support plate 42. Thus, the femur bar 10 can be pivoted horizontally side to side.

A joint housing 50, through which the rotary axle 60 passes, is disposed inside the hip joint 40. A bearing 51 is interposed between the rotary axle 60 and the joint housing 50, such that the joint housing 50 does not move, in spite of the rotation of the rotary axle 60. This joint housing 50 functions to support the rotary axle 60, which rotates together with the hip joint 40.

The rotary axle 60 is installed horizontally side to side, one end thereof is coupled to the hip joint 40, and the other end thereof is coupled to a seesaw lever 70. When the hip joint 40 rotates, the rotary axle 60 rotates therewith. This rotation of the rotary axle 60 is transmitted to the pelvic angle adjusters 70, 100 and 200, including the seesaw lever 70.

The pelvic angle adjusters 70, 100 and 200 function to adjust the angle of the pelvic plate 20 on the basis of the rotation of the rotary axle 60, and include the seesaw lever 70 and two spring members 100 and 200.

The seesaw lever 70 includes a core part 70a, a front lever part 71, which is disposed in front of the rotary axle 60, and a rear lever part 72, which is disposed behind the rotary axle 60. The rotary axle 60 is fixed through the core part 70a. When the rotary axle 60 rotates, the seesaw lever 70 undergoes a seesaw motion, which is transmitted to the spring members 100 and 200.

The spring members 100 and 200 are vertically installed on the front and rear lever parts 71 and 72 via lower end couplers 110 and 210, respectively. The spring members 100 and 200 include housings 101 and 201, in which springs (not shown) are installed. At upper ends of the housings 101, 102 are upper end couplers 120 and 220. When the upper end couplers 120 and 220 are pressed, the springs are compressed in the housings 101 and 201. When the upper end couplers 120 and 220 are released, the springs can be restored to original positions.

Meanwhile, the upper ends of the spring members 100 and 200, particularly the housing 101 and 201, are fixed to the pelvic plate 20. The pelvic plate 20 is provided with adjuster bolls 130 and 230 thereon such that the upper end couplers 120 and 220 can be compressed or released. Since one seesaw lever 70 is provided to each of the left and right femur bars 10, a total of four adjuster bolts 130 and 230 are installed on the pelvic plate 20, as shown in FIG. 4.

The rotary axle 60 is exposed at the left side in FIG. 5 of the seesaw lever 70. The exposed rotation axle 60 is coupled with an angle sensor 90, which is supported by a sensor holder 80, in an axial direction. The leading end of the angle sensor 90 is coupled to the rotary axle 60, so that the angle sensor 90 can detect the amount of rotation when the rotary axle 60 rotates. A bearing 81 is interposed between the sensor holder 80 and the rotary axle 60.

Although an exemplary embodiment of the present invention has been described for illustrative purposes, those skilled in the art wilt appreciate that various modifications, additions and substitutions are possible, without departing from the scope and spirit of the invention as defined in the accompanying claims.

What is claimed is:

1. A pelvis assembly for a dummy, comprising:
   a pelvic plate, configured for a lumbar region of the dummy to be coupled thereto; and
   one of more pelvic units, attached to the pelvic plate and configured to transmit motion from a femur bar of the dummy to the plate, wherein each pelvic unit comprises:
   a hip joint, configured to be attached to the femur bar;
   a rotary axle, a first end of which is attached to the hip joint, and which is disposed in a substantially lateral direction of the dummy, the axle being configured to rotate together with the hip joint when the femur bar pivots vertically; and
   one or more pelvic angle adjusters, installed near a second end of the rotary axle, configured to transmit rotation of the rotary axle to the pelvic plate, thereby changing a vertical angle of the pelvic plate.

2. The pelvis assembly according to claim 1, wherein the pelvic angle adjusters comprise:
   a seesaw lever, a core part of which is coupled near the second end of the rotary axle, and comprising front and rear lever parts that undergo a seesaw motion when the rotary axle rotates;
   a first spring member, a lower end of which is attached to the front lever part, and an upper end of which is attached to the pelvic plate; and
   a second spring member, a lower end of which is attached to the rear lever part, and an upper end of which is attached to the pelvic plate.

3. The pelvis assembly according to claim 2, further comprising a pair of adjustor bolts, which are installed on the pelvic plate so as to be able to adjust an amount of compression of the spring members.

4. The pelvis assembly according to claim 1, further comprising an angle sensor, which detects a rotational angle of the rotary axle, at the second end of the rotary axle.

5. The pelvis assembly according to claim 1, wherein the hip joint comprises: a body, to which the first end of the rotary axle is fixed; and a vertical rotary spindle, which is rotatably installed on the body, configured to be attached to the femur bar.

6. The pelvis assembly according to claim 1, comprising two pelvic units at left and right sides of the pelvic plate, wherein the vertical angle of the pelvic plate can be individually changed on a basis of movement of one of the femur bars.

* * * * *